(12) United States Patent
Boespflug et al.

(10) Patent No.: US 7,748,664 B2
(45) Date of Patent: Jul. 6, 2010

(54) HIGH PERFORMANCE SYNTHETIC VALVE/PULSATOR

(75) Inventors: Matthew Patrick Boespflug, Clifton Park, NY (US); Seyed Gholamali Saddoughi, Clifton Park, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 890 days.

(21) Appl. No.: 11/508,469

(22) Filed: Aug. 23, 2006

(65) Prior Publication Data

US 2008/0087771 A1 Apr. 17, 2008

(51) Int. Cl.
*B64C 21/04* (2006.01)
*B64C 21/06* (2006.01)

(52) U.S. Cl. ............... 244/208; 92/50; 239/265.19; 417/486

(58) Field of Classification Search ............ 244/204, 244/207, 208; 92/50, 75; 60/264, 771, 767, 60/768; 239/265.17, 265.19; 417/413.1, 417/486, 487, 488
See application file for complete search history.

(56) References Cited

U.S. PATENT DOCUMENTS

| | | | | |
|---|---|---|---|---|
| 2,036,536 A | * | 4/1936 | Ormsby | 92/50 |
| 2,160,565 A | * | 5/1939 | Savio | 91/536 |
| 2,619,907 A | * | 12/1952 | Paterson | 92/60 |
| 2006/0127247 A1 | * | 6/2006 | Caddell | 417/413.1 |

* cited by examiner

*Primary Examiner*—Rob Swiatek
(74) *Attorney, Agent, or Firm*—Bracewell & Giuliani LLP

(57) ABSTRACT

A system and method for actively manipulating fluid flow over a surface using synthetic pulsators. Synthetic pulsators produce pulsed jet operable to manipulate the primary fluid flow proximate to the synthetic pulsator. The synthetic pulsator includes a dual diaphragm synthetic jet coupled to high performance dual actuator solenoids, wherein the synthetic jet is operable to produce an oscillatory flow. The oscillatory flow of the synthetic jet(s) produces the pulsed jet operable to manipulate the primary fluid flow. These synthetic pulsators may then be actively manipulated to control the flow behavior of the ducted fluid flow, influence the inception point and trajectory of flow field vortices within the fluid flow, and reduce flow separation within the primary fluid flow.

28 Claims, 10 Drawing Sheets

HIGH PERFORMANCE SYNTHETIC VALVE/PULSATOR

TECHNICAL FIELD OF THE INVENTION

The present invention relates generally to manipulation of fluid flows and more particularly, a system and method for manipulating fluid flows with active synthetic jets operable to pulse steady control fluid flows.

BACKGROUND OF THE INVENTION

Adverse (pressure gradient) fluid flows generated over aerodynamic surfaces can buffet and fatigue any downstream structures so exposed. Additionally, such flows can affect efficiency by increasing drag or resistance over the surface. Such adverse fluid flows can be generated at the fore body of an aircraft or other upstream structure, and damage control surfaces, engines, after body/empennage, nacelles, turrets, or other structures integrated into the airframe. Additionally, these adverse fluid flows can be ingested within engine air intakes or other like air inlets leading to poor performance and/or stalling of the aircraft engines. Stalling the aircraft engine creates a potentially hazardous condition.

Next generation aircraft, such as blended wing body, compound this problem by incorporating gas turbine inlets with serpentine spines within the air frame. Additionally, exotic aperture shapes for the inlet and outlet may cause excessive propulsion performance losses. These losses emanate from strong secondary flow gradients in the near wall boundary of the airflow, which produce coherent large-scale adverse fluid flows.

In the past, aircraft components were designed to minimize the strength of adverse pressure gradient flow fields to reduce the extent of or eliminate the separation of boundary layer flow from aircraft surfaces to reduce the destructive structural impact of separated flow on aircraft components and performance. This approach limits design options and increases vehicle size, weight and cost. Alternatively, the components in the path of the adverse fluid flows were structurally hardened or replaced more frequently to avoid failures resulting from these stresses. Placing components, such as engines or control surfaces, in non-optimal positions in order to reduce these stresses often results in reduced vehicle performance. Similarly, adding structural weight to support increased stress loads caused by the flow field vortices also results in reduced vehicle performance.

Another solution employs active or passive control flows to mitigate the effects of the adverse flow fields. However, these control flows create a need for compressed air and piping to bring the control jets to regions requiring flow-control authority. These control jets then manipulate the boundary layer with induced mixing between the primary fluid flow and the secondary fluid flow. This solution also adds structural weight to supply and support the control jets that result in reduced vehicle performance.

In either of the above described solutions, mixing is promoted by vortices trailing longitudinally near the edge of the boundary layer. Fluid particles with high momentum in the stream direction are swept along helical paths toward the aircraft surfaces to mix with and, to some extent replace low momentum boundary layer flow. This is a continuous process that provides a source to counter the natural deceleration of the flow near a solid surface in a boundary layer that can lead to flow separation in regions with adverse pressure gradients and low energy secondary flow accumulation.

To avoid the increased weight of the supply system for control jets, synthetic jets may be employed. These synthetic jets may be those described in U.S. Pat. No. 6,722,581 entitled "SYNTHETIC JET ACTUATORS," which is hereby incorporated by reference. Synthetic jets, which may be large scale devices or small scale Micro-fabricated Electro-Mechanical Systems (MEMS) devices, are known to influence the flow over a surface, for example to control flow separation on an airfoil. A typical synthetic jet actuator comprises a housing defining an internal chamber. An orifice is present in a wall of the housing. The actuator further includes a mechanism in or about the housing for periodically changing the volume within the internal chamber so that a series of fluid vortices are generated and projected into an external environment beyond the orifice of the housing. Various volume changing mechanisms are known, for example a piston positioned in the jet housing to move so that fluid is moved in and out of the orifice during reciprocation of the piston, or a flexible diaphragm as a wall of the housing. The fluid moved may be either a liquid or gas. The flexible diaphragm is typically actuated by a piezoelectric actuator or other appropriate means.

Typically, a control system is utilized to create time-harmonic motion of the diaphragm. As the diaphragm moves into the chamber, decreasing the chamber volume, fluid is ejected from the chamber through the orifice. As the fluid passes through the orifice, the flow separates at the sharp edges of the orifice and creates vortex sheets which roll up into vortices. These vortices move away from the edges of the orifice under their own self-induced velocity. As the diaphragm moves outward with respect to the chamber, increasing the chamber volume, ambient fluid is drawn from large distances from the orifice into the chamber. Since the vortices are already removed from the edges of the orifice, they are not affected by the ambient fluid being drawn into the chamber. As the vortices travel away from the orifice, they synthesize a jet of fluid, a "synthetic jet," through entrainment of the ambient fluid.

However, these devices have relatively limited capacity, in that moving elements are limited in power and/or deflection unless driven by a large, heavy electromechanical device which is impractical for most aircraft applications. Although high-amplitude high-frequency jets may be created synthetically, application of these devices has been restricted due to the inability to generate sufficient pressure to choke the flow at the jet orifice. This is the condition necessary to create sonic flow at the orifice. Therefore, it would be desirable to obtain increased performance of synthetic jet actuators in such environments. Accordingly, there is a need for a synthetic jet actuator having greater capacity than previous devices.

SUMMARY OF THE INVENTION

The present invention provides a synthetic jet or pulsator that substantially addresses the above-identified needs. More particularly, the present invention provides a synthetic pulsator operable to overcome limitations set by current valves and pulsators. Additionally, these synthetic pulsators may provide increased strength and performance when compared to existing pulsators or jets. The synthetic pulsator produces a pulsed output which may achieve greater mixing and penetration of the primary flow above the synthetic jet.

The synthetic pulsator includes synthetic jet actuator(s) operable to produce an oscillatory flow. The oscillatory flow of the synthetic jet(s) and the continuous fluid flow of the fluidic jet(s) combine or mix to produce the pulsed jet operable to manipulate the primary fluid flow. The continuous flow may be provided at the periphery of the synthetic jet or directly into the interior chamber of the synthetic jet.

Additional embodiments may further couple the synthetic jet to a control system wherein the amplitude and frequency of the oscillatory flow can be controlled. This allows the pulsed jet to impart high amplitude high frequency eddies to the fluid flow in a controlled manner.

Another embodiment provides a flow control method capable of manipulating the primary fluid flow. As in the first embodiment, the manipulation of the primary fluid flow may involve the reduction of flow separation within the primary fluid flow, the manipulation of flow behavior of the primary fluid flow, or the manipulation of the inception point, size, and trajectory of flow field vortices within the primary fluid flow. This flow control method involves embedding fluid jet(s) and synthetic jet(s), which collectively form the synthetic pulsator, within a surface, such as an aerodynamic surface or control surface, where the fluidic jet is proximate to the synthetic jet. The fluidic jet provides a continuous fluid flow at the periphery of the synthetic jet or directly into the interior chamber of the synthetic jet. The synthetic jet generates an oscillatory flow whose amplitude and frequency may be controlled. The continuous fluid flow and oscillatory flow mix to produce a pulsed jet that in turn may manipulate the primary fluid flow over the surface.

Another embodiment may utilize a number of both fluidic jets and synthetic jets embedded within the surface to form an array of synthetic pulsators which in turn may then manipulate the primary fluid flow about the surface.

Yet another embodiment of the present invention provides an aerodynamic surface, control surface, or aircraft wherein synthetic pulsator(s) within these surfaces are operable to manipulate fluid flow over the surface. These synthetic pulsators may be placed substantially upstream of the fluid flow to be manipulated to achieve a desired fluid flow. A control system may communicatively couple to the array of synthetic pulsators. The control system may direct how the synthetic pulsators introduce secondary flows in order to achieve the desired fluid flows. Further embodiments may include a sensing system that detects the behavior of the fluid flow over the surface and provides a feedback signal to the control system which may then further manipulate the synthetic pulsators in order to achieve a desired fluid flow.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the figures like numerals being used to refer to like and corresponding parts of the various drawings.

The present invention provides a system and method for manipulating aerodynamic or hydrodynamic fluid flow over a surface that substantially eliminates or reduces disadvantages and problems associated with previously developed systems and methods. More specifically, the present invention provides a system and method to manipulate flow fields with a synthetic pulsator that combines a steady fluid flow and a pulsed fluid flow provided by synthetic jet. This fluid may be a liquid or gas. Embodiments of the present invention may place arrays of such pulsators on or within surfaces bounding the fluid flow. These effectors may be operable to manipulate the flow behavior of the fluid flow, influence the inception point, size, and trajectory of flow field vortices within the fluid flow, and reduce flow separation within the primary fluid flow.

Figure 1:
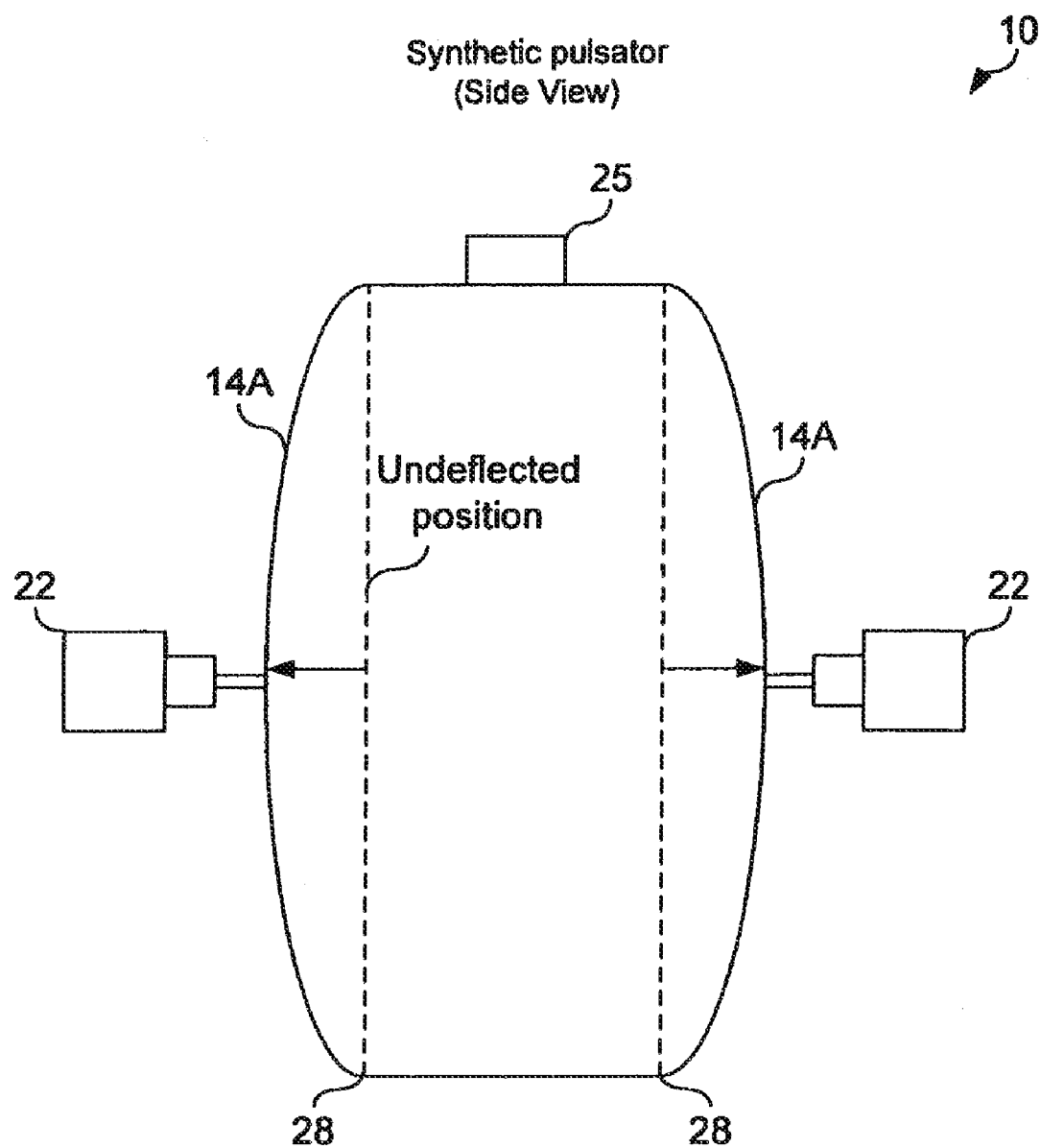
FIG. 1 depicts a synthetic pulsator operable to introduce secondary flow structures in accordance with an embodiment of the present invention.
Figure 2:
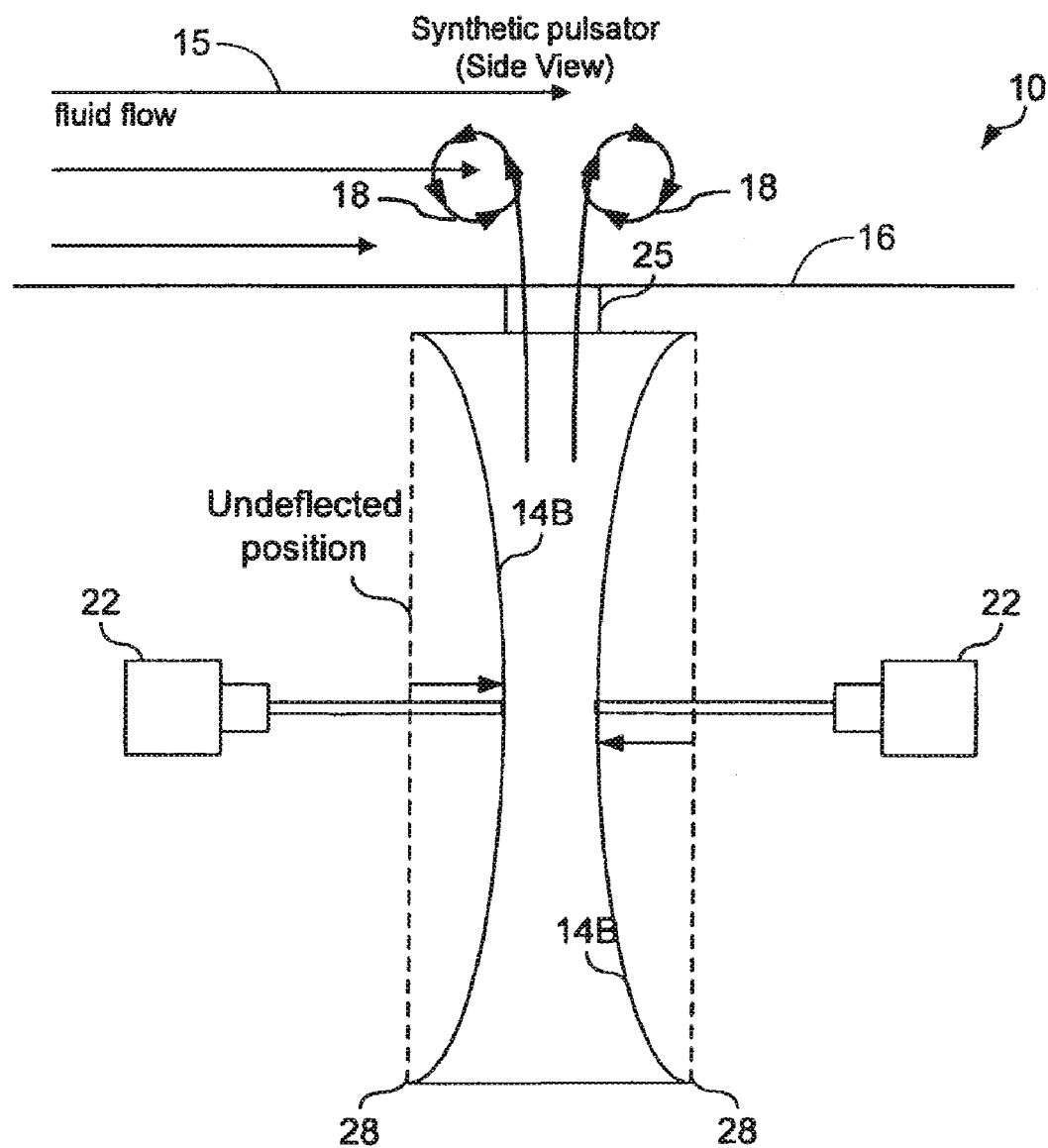
FIG. 2 depicts a second embodiment of a synthetic pulsators operable to introduce secondary flow structures in accordance with an embodiment of the present invention.
Figure 3:
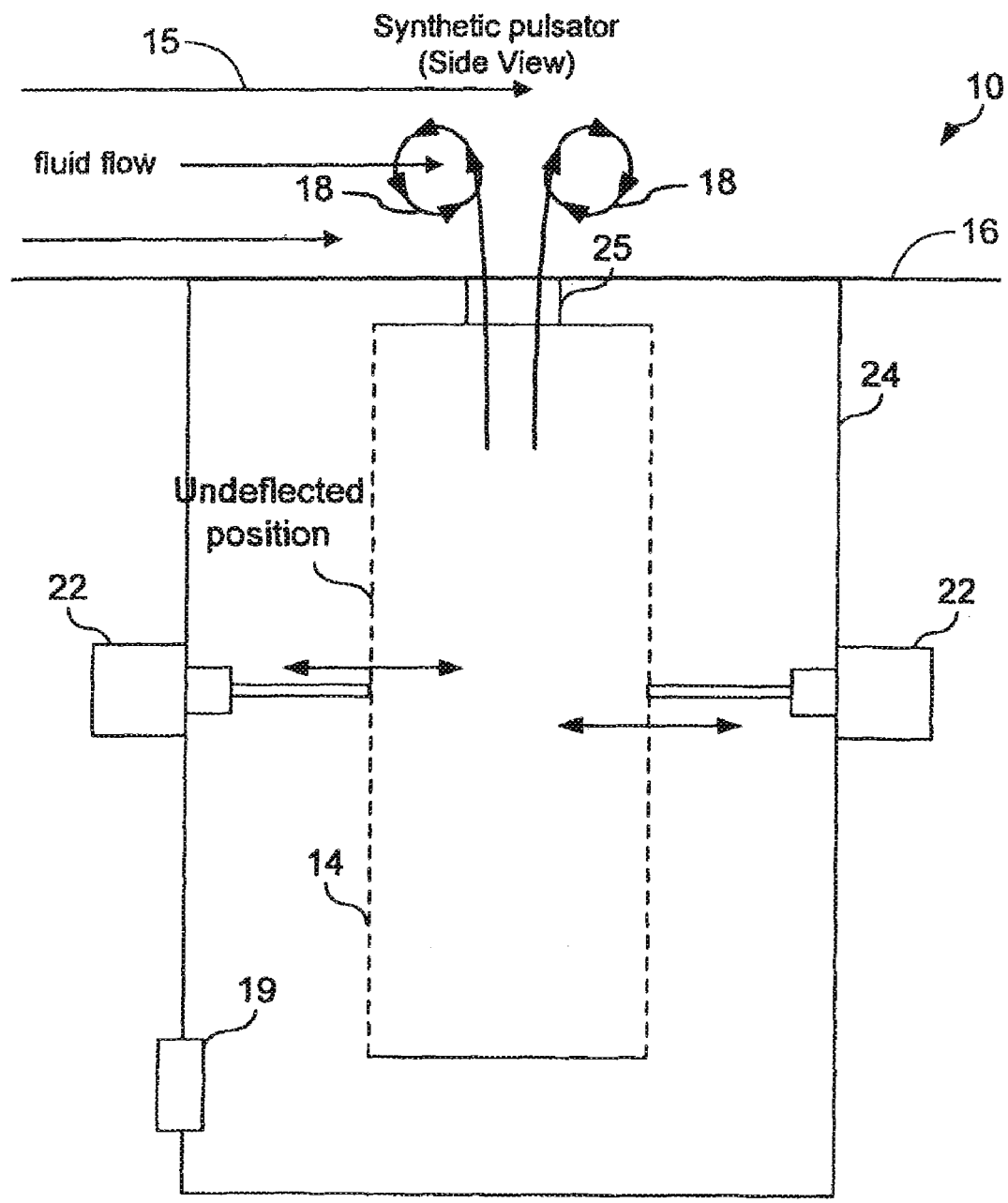
FIG. 3 depicts an embodiment of synthetic pulsators operable to introduce secondary flow structures in accordance with an embodiment of the present invention.

FIGS. 1 and 2 depict an embodiment of a synthetic pulsator in accordance with an embodiment of the present invention. The synthetic pulsator may be embedded within surface and is operable to produce secondary flow structures 18 within primary fluid flow 15. FIG. 1 shows the synthetic pulsator filling while FIG. 2 shows the synthetic pulsator expelling fluid. Additional embodiments may place the synthetic pulsator within a pressurized chamber operable to reduce the pressure differential across the "bellows" 14 of the synthetic pulsator. This pressurized chamber 24, as shown in FIG 3 is supplied a positive pressure from supply port 19. Supply port 19 or other optional orifices (not shown) may be used to reduce the pressure differential across the "bellows" of the synthetic pulsator. The positive pressure of the fluid supplied by port 19 reduces backflow from fluid external to the surface and increases the efficiency of the synthetic pulsator. The synthetic pulsator operates more efficiently in higher pressure environments than previous synthetic pulsators due to the use of mechanisms that deflect bellows 14. Additionally, the mechanical stress placed on the "bellows" or diaphragms is greatly reduced. This bellows may be plates of elastic alloys attached to piezo-electric materials that oscillate as a differential voltage is applied to the piezo-electric material. High performance dual solenoid (HPDS) mechanisms may be used to improve the performance of the synthetic pulsator. HPDS may be attached externally or internally within the bellows to rapidly deflect the bellows. Larger deflections of the bellows become possible that where not previously possible when a large differential pressure across the "bellows" existed with weaker materials. Thus, the ability of the synthetic pulsator to modulate the oscillatory flow 21 from the pulsator may be greatly enhanced.

Synthetic pulsator 10 may oscillate to produce oscillatory flow 21 that is operable to produce secondary flow structures 18 within primary fluid flow 15. This oscillation may be achieved by changing the interior volume of the synthetic pulsator 10. Synthetic pulsators are devices that can be used in a wide variety of aerodynamic applications such as boundary-layer separation control (increase in airfoil efficiency), wake reduction and mixing enhancement (engine-noise reduction). The synthetic pulsator used may incorporate a Dual Bimorph Synthetic jets (DBSJ). DBSJs may employ multiple, for example 2 or 4 moving elements, to address the limited capacity of synthetic jets having only a single moving element.

In one embodiment a varying voltage signal is applied to the HPDS 22 attached to the walls ("bellows" 14) of the synthetic pulsator, where the walls are formed from an elastic or super elastic alloy, or other like material, that causes the walls to contract or expand in response to the applied signal. Thus, the synthetic pulsator behaves like an oscillating bellows to produce the desired oscillatory flow. The amplitude and frequency of the signal applied to the HPDS directly effect the amplitude and frequency of the oscillatory flow 21.

Supply port 19 may introduce steady fluid flows that combine with the oscillatory function of synthetic pulsator 10 to create high-frequency (kHz or greater) pulsating jets that cause secondary flow structures 18 (high amplitude high frequency eddies) to form in the near wall boundary layer between fluid flow and aerodynamic surface 16. The pulsating synthetic jets, when pulsed at high frequencies, reduce the required amount of air to manipulate the primary fluid flow, because pulsation (imparting high amplitude high-frequency small eddies) enhances the naturally occurring instabilities of primary fluid flow 15. Alternatively, the pulsator increases the mixing and thereby the effectiveness of fluid injection. Thus, control can be achieved at lower mass-flow rates. This reduces the structural weight and input steady airflow requirements associated with such control systems.

FIG. 3 provides a side view of synthetic pulsator 10 within pressurized chamber 24. In FIG. 3, bellows 14 are deflected such that they expand the internal volume of synthetic pulsator 10. Dotted lines 28 indicate the undeflected position of bellows 14, which are indicated as deflected bellows 14A, causing the internal volume of the synthetic pulsator to greatly expand. The positive pressure supplied by the fluids supplied by supply port 19 fills the internal volume of the synthetic pulsator. During the expansion of the internal volume, little or no fluid flow may be observed through orifice 25 into the internal volume of synthetic pulsator 10. Because of the positive pressure of pressurized chamber 24, fluid flow is then forced primarily through orifice 25 resulting in oscillatory flow 18. When looking at FIGS. 1 through 3, one may observe that oscillatory flow from the synthetic pulsator through orifice 25 will be greatest as bellows 14 is repositioned from an expanded position 14A to a contracted position 14B. As the bellows then expand again, little or no flow may be observed from the external environment through orifice 25 into the synthetic pulsator because of the positive pressure supplied by pressurized chamber 24.

This allows secondary flow structures 18 to be created and not trapped. Thus, steady control fluid jets formed by the synthetic pulsator introduce secondary flow structures 18 that manipulate the flow behavior of the fluid flow, influence the inception point, size, and trajectory of flow field vortices within the fluid flow above the synthetic pulsator, and reduce flow separation within the primary fluid flow 15 above the synthetic pulsator.

Figure 4:
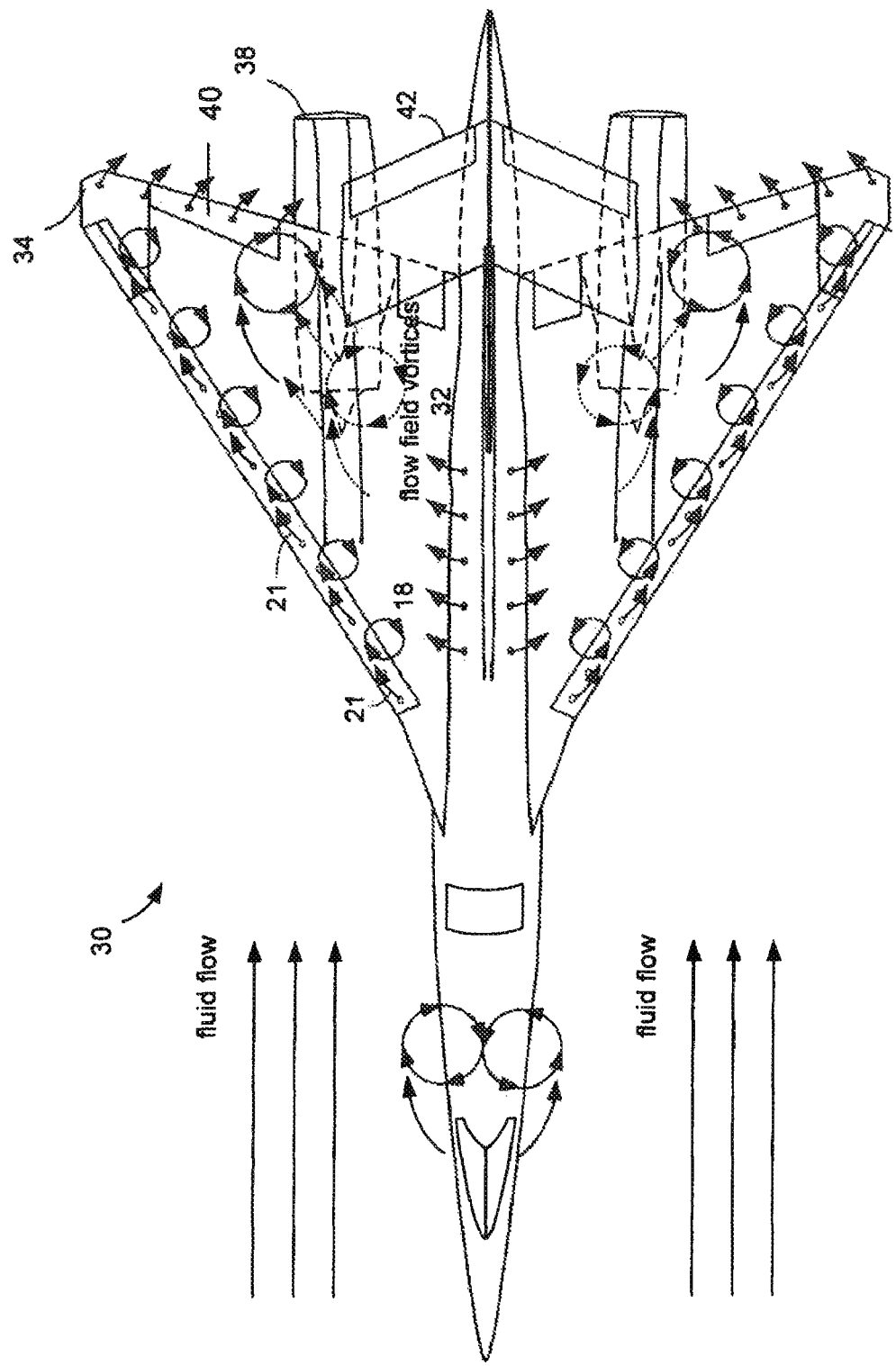
FIG. 4 depicts an aircraft utilizing an array of synthetic pulsators to influence the flow-field over an aircraft in accordance with an embodiment of the present invention.

One potential implementation applies these pulsator arrays to a vehicle, such as but not limited to aircraft. In FIG. 4, synthetic pulsators are embedded within the aerodynamic surface of an aircraft. Other aerodynamic vehicles such as automobiles, trucks, trains, boats, ships, submarines and submersible craft that are sensitive to aerodynamic or fluidic constraints may have the pulsator array applied to address aerodynamic or hydrodynamic concerns and improve the performance of these vehicles.

FIG. 4 depicts aircraft 30 that experiences flow field vortices 32. These flow field vortices are generated from the leading or trailing edges of external components on the aircraft. These flow field vortices can adversely affect downstream components of the aircraft such as but not limited to engines, weapons either in carriage or released, fuel or storage nacelles, after body structures, such as the tail or empennage, control surfaces, canards, wings, air intake inlets, such as engine air inlets or sensor air inlets, or other downstream components known to those skilled in the art.

FIG. 4 specifically shows that discontinuities in the aircraft's surface, such as those at the cockpit, can generate flow field vortices 32. Wing 34 is also shown to generate flow field vortices 32. As shown, an array of synthetic pulsators has been placed on the leading edge of wing 34. These introduce high frequency pulsed jets that in turn induce secondary flow structures 18. These secondary flow structures may influence the inception point, size, and trajectory of flow field vortices away from downstream components as shown. Flow field vortices 32, located over wing 34, if left unimpeded, would buffet empennage 42. However, these vortices are shifted outwards by the effect of the secondary flow structures 18. By reducing the buffeting and fatigue caused on downstream components, the structural requirements for these components may be reduced. Additionally, should the flow field vortices be ingested within an air inlet, potentially hazardous stresses can be placed on the aircraft engine resulting in stalling or component failure. For example, turbine blades within the aircraft engine may be severely stressed when ingesting flow field vortices. Thus, the performance of aircraft 30 may be improved significantly by actively shedding the flow field vortices 32 in such a manner to reduce stresses on downstream components.

Although FIG. 4 shows the array of synthetic pulsator 10 as being placed on the leading edge of the wing, these synthetic pulsators may be placed on the trailing edge or along the fuselage of aircraft 30. For example, when placed along the fuselage, span-wise blowing to a highly swept structure may increase lift while reducing weight and the affects of vortexes. It should be further noted that the fluid used to pressurize the chambers containing the synthetic pulsators may be drawn from a dedicated compressor, anywhere in the engine cycle, or other like source. In some embodiments, the synthetic pulsators may improve performance resulting in a 5 to 20 percent increase in lift. When compared to conventional systems, the weight of internal plumbing and quantity of bleed air required are greatly reduced as the effect of the secondary flows is greatly improved by the synthetic pulsators.

Figure 5A:
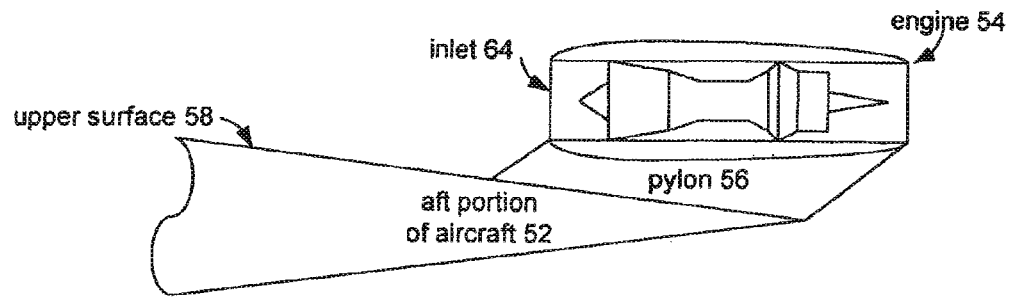
FIGS. 5A, 5B and 5C depict a cross-section of a next generation aircraft, such as a blended wing body, having synthetic pulsator arrays operable to minimize the impact of boundary layers on engines located near or submerged within the upper surface of the airframe.
Figure 5B:
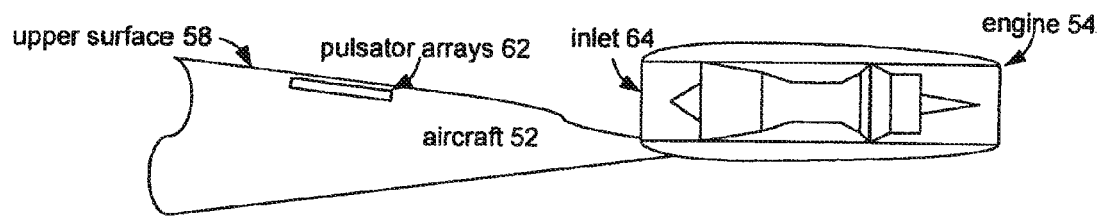
Figure 5C:
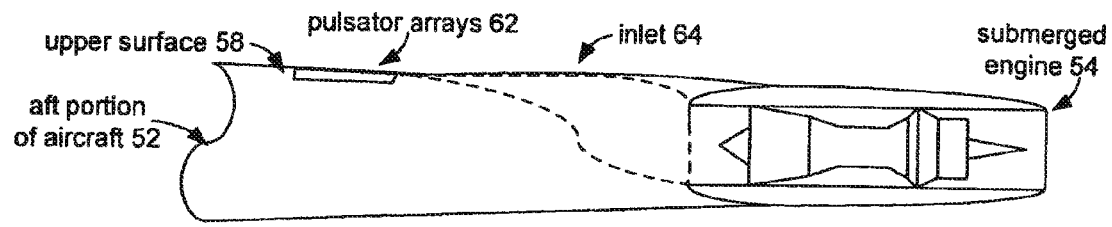

FIGS. 5A, 5B and 5C, depict cross-sections of a next-generation aircraft such as the blended wing body (BWB) where the engine inlets are placed near the upper surface or submerged within the upper surface on the aft section of the aircraft. Here aircraft 52 has the engine 54 located near the aft portion of the aircraft. Actively controlling the flow field may greatly improve the performance of aircraft that locate engines near the upper surface of or submerge the engines within the airframe by removing inlet distortion and increasing pressure recovery. FIG. 5A depicts engine 54 being mounted on a pylon 56 but located near the upper surface 58 of aircraft 52. Mounting above but near the upper surface avoids some problems associated with ingesting boundary layer flow (low energy boundary layer air) at or near upper surface 58. FIG. 5B depicts an instance where engine 54 is mounted at the surface to eliminate the pylon or nacelle supporting engine 54. By eliminating the pylon or nacelle 56, a smaller surface area is experienced and less structure is required, thus reducing weight and drag of the aircraft 52. FIG. 5C depicts the instance where an engine 54 is submerged within the upper surface 58 of aircraft 52. In the cases presented in FIGS. 5B and 5C, pulsator arrays 62 are used to actively control and manipulate the boundary layer as seen by inlet 64 of engine 54. These pulsator arrays 62 may use continuous or pulsating air jets for boundary layer control. These micro-jets manipulate the shedding, size, and trajectory of vortices as well as the boundary layer to improve the performance of engine 54. Previous solutions may have merely used static vortex generators to manipulate the boundary layer and flow structures ingested by the engines. Although these engines may still experience airflow distortion, the micro-jets located forward of the inlets to engine 54 can significantly reduce distortion of the airflow ingested by these engines. This may reduce the portion of the lower energy boundary layer ingested by an engine located near the surface or submerged within the surface of the airframe. By reducing the amount of low energy boundary layer air ingested by the engine, the present invention can significantly improve the performance of a vehicle such as a next-generation aircraft like the BWB where engine inlet distortion can be controlled.

Figure 6:
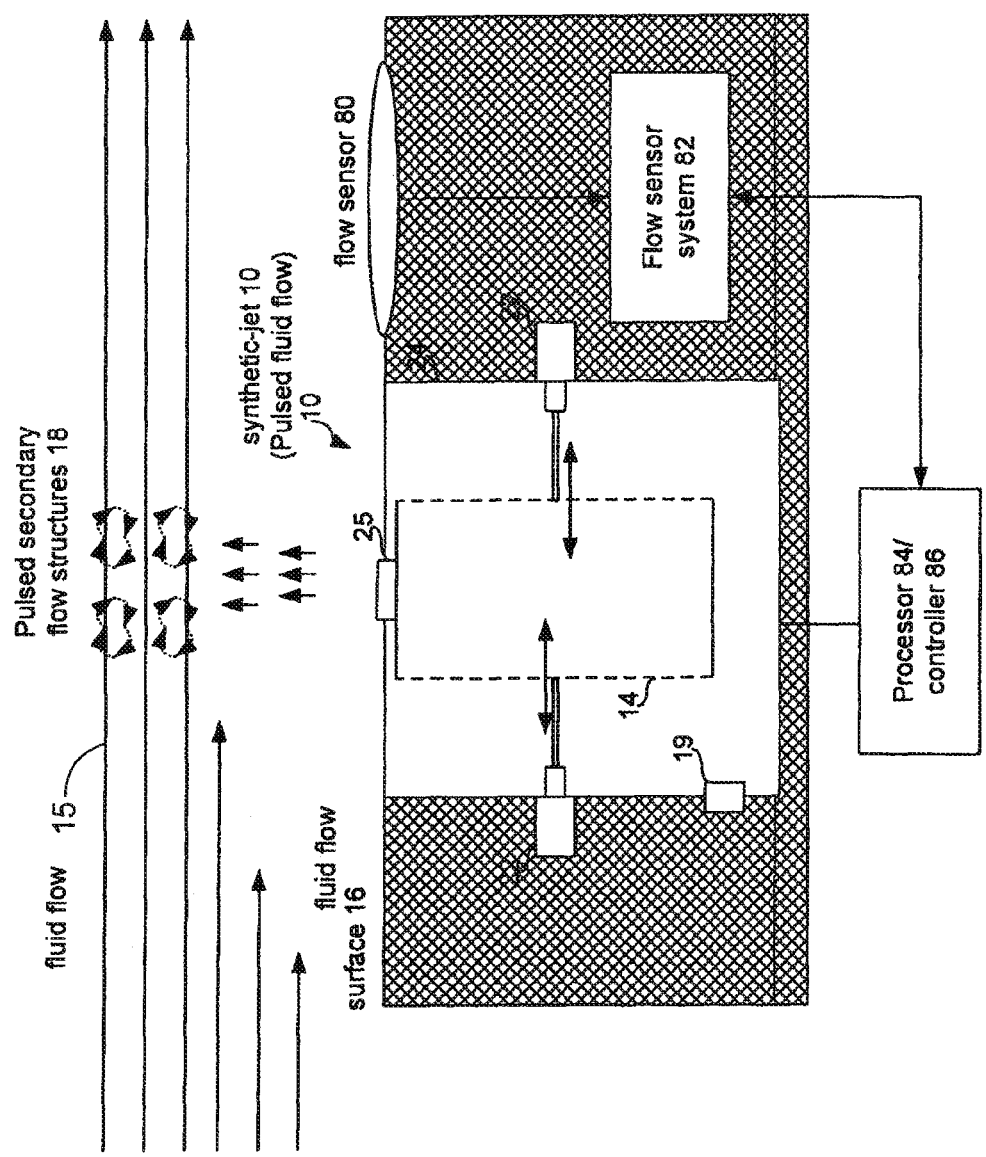
FIG. 6 provides a functional diagram of an aerodynamic surface or control surface operable to sense flow conditions and influence flow-field vortices over the aerodynamic surface in accordance with an embodiment of the present invention.

FIG. 6 depicts an aerodynamic surface or control surface 16. Here, arrays of synthetic pulsators 10 are embedded within surface 16 and introduce pulsed jet 18.

A control system 60 may operably couple to the array of steady synthetic pulsators 10 in order to actively direct the frequency and amplitude of synthetic jets that introduce secondary flows 18. This allows a desired fluid flow to be realized over aerodynamic surface. This control may be realized by controlling the amplitude and frequency of the signal used to drive the HPDS of the synthetic pulsators. The mechanical stress across the diaphragm or piezoelectric material of the synthetic pulsators may be reduced by reducing the differential pressure with static pressure chamber 24, wherein positive pressure may be supplied by an external source. Alternatively, the strength and the performance of the diaphragm may be improved with elastic or super-elastic materials.

This active control may be further enhanced with a sensing system 82 operably coupled to the processor 84 and controllers 86. This sensing system may employ flow sensors 80 located at various locations along aerodynamic surface 16. These flow sensors are operable to detect the characteristics of fluid flow 14 over aerodynamic surface 16. Sensor outputs are provided to flow sensor system 82 and processor 84. Processor 84 compares the detected fluid flow characteristics over aerodynamic surface 16 with a desired fluid flow characteristic. Then processor 84 will actively direct controller 86 to introduce secondary flows 18 to achieve a desired fluid flow over aerodynamic surface 16.

Processor 84 and controller 86 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

As previously stated, these synthetic pulsators and flow sensors may be incorporated in any aerodynamic surface. However, in many instances, more value may be realized by placing these systems within receptive zones of the aerodynamic surface such as the leading edge of the aerodynamic surfaces. The desired fluid flow may avoid having flow field vortices adversely impact downstream components. The desired fluid flow also reduces the fatigue or buffeting of downstream components.

The steady control fluid jets and synthetic jets may be very-small-scale devices. In some embodiments these jets are on the order of one-tenth of the boundary layer thickness. These may be miniature vortex generators or vortex generator jets fabricated in many ways and applied as an appliqué to or cast into the surface. The steady control fluid jets may be miniature fluidic jets that introduce momentum in the form of steady or pulsed control flows. These fluid flows may be continuous or pulsed and combine with pulsed outputs of the synthetic jets. The control jets may take bleed air from the primary flow associated with an engine. Other similarly sized jets, known to those skilled in the art, may also be used as the steady control fluid jets.

Figure 7:
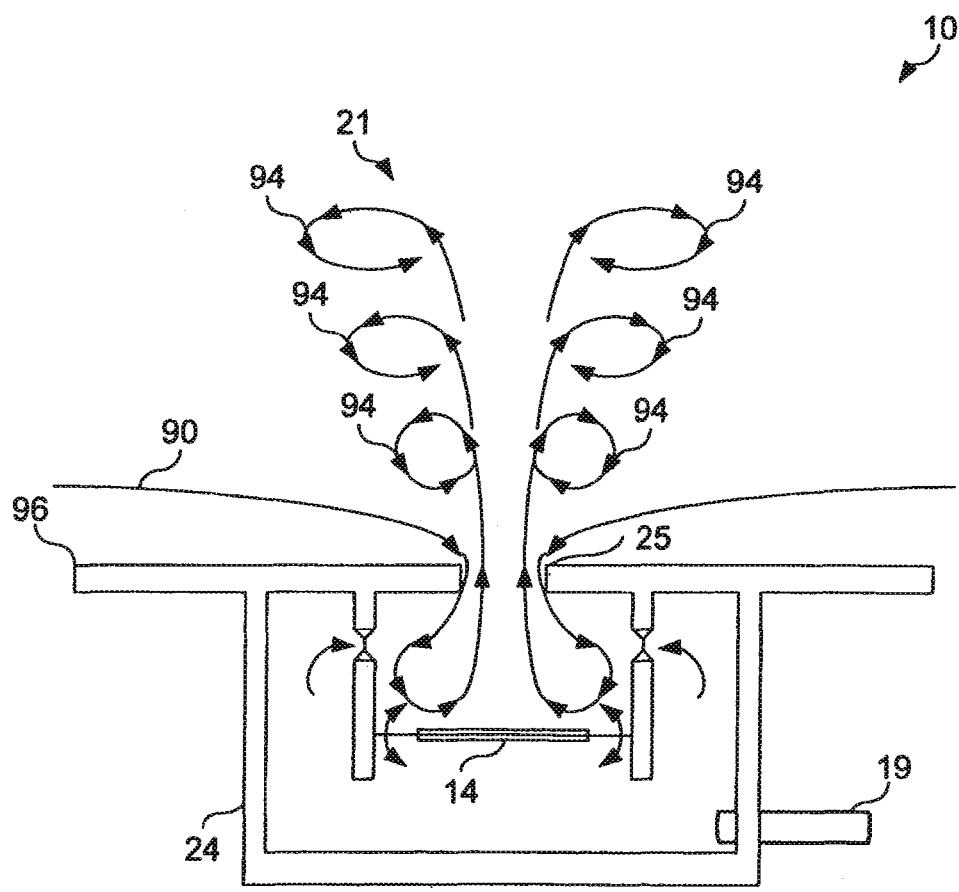
FIG. 7 depicts a potential synthetic jet actuator to provide a pulsed fluid flow input to the synthetic pulsator in accordance with an embodiment of the present invention.

FIG. 7 describes in further detail how an alternative embodiment of a synthetic pulsator operates in accordance with an embodiment of the present invention. Synthetic jet actuators may be used within the synthetic pulsators provided by embodiments of the present invention. Flow 90 is alternately pushed in and out of orifice 25. The amount of inward flow 90 through orifice 25 is minimized by the positive pressure and air supply from port 19 to the chamber 24. The exiting fluid separates and rolls into a vortex ring 94 and propagates away from the exit plane 96 due to self induced velocity. Thus, in contrast to conventional continuous or pulsed jets, synthetic pulsators transfer linear momentum to the flow more efficiently. Synthetic jets are able to provide momentum flux, alter pressure distribution, and to introduce arbitrary scales to another more traditional steady or pulsed flow. This ability may be enhanced by reducing the differential pressure across bellows 14 in a high pressure environment by placing the synthetic jet within a static pressure chamber 24.

Another embodiment provides an aerodynamic control surface that actively manipulates the inception point, size and trajectory of flow field vortices and/or boundary layer separation over the aerodynamic control surface. This aerodynamic control surface will have pulsator arrays operable to introduce secondary flows in the near wall boundary layer. These secondary flows reduce boundary layer separation over the aerodynamic control surface. By reducing boundary layer separation, the overall size of the control surface as well as support for the control surface may be reduced. In an aircraft, for example, this may result in significant weight reduction as the structural requirements associated with the aircraft control surfaces and their control systems may be reduced. A control system operably coupled to the pulsator arrays may direct pulsator arrays to introduce secondary flows in order to achieve desired fluid flow over the control surface.

Figure 8:
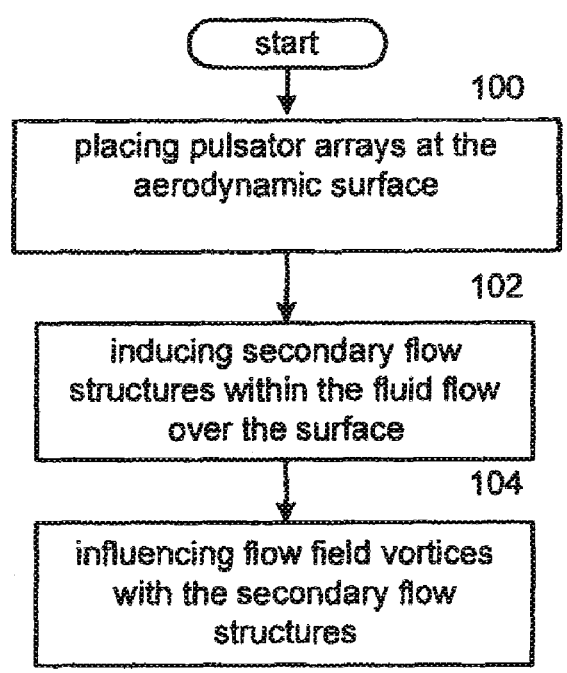
FIG. 8 provides a logic flow diagram illustrating one embodiment of the present invention.

FIG. 8 provides a logic flow diagram illustrating a method associated with the present invention. Generically, this method involves placing the synthetic pulsator arrays at a surface in step 100. Then, in step 102, secondary flow structures are induced within the fluid flow over the aerodynamic surface by the pulsator arrays. This involves the combination of both steady control flows from fluidic jets and pulsed flows from synthetic jets. As previously stated, these may combine to form high frequency pulsating jets operable to induce secondary flow structures within the fluid flow over the surface. In step 104, the flow field over the surface is influenced by the secondary flow structures. The secondary flow structures may specifically influence the inception point and trajectory of the flow field vortices or boundary layer separation.

Figure 9:
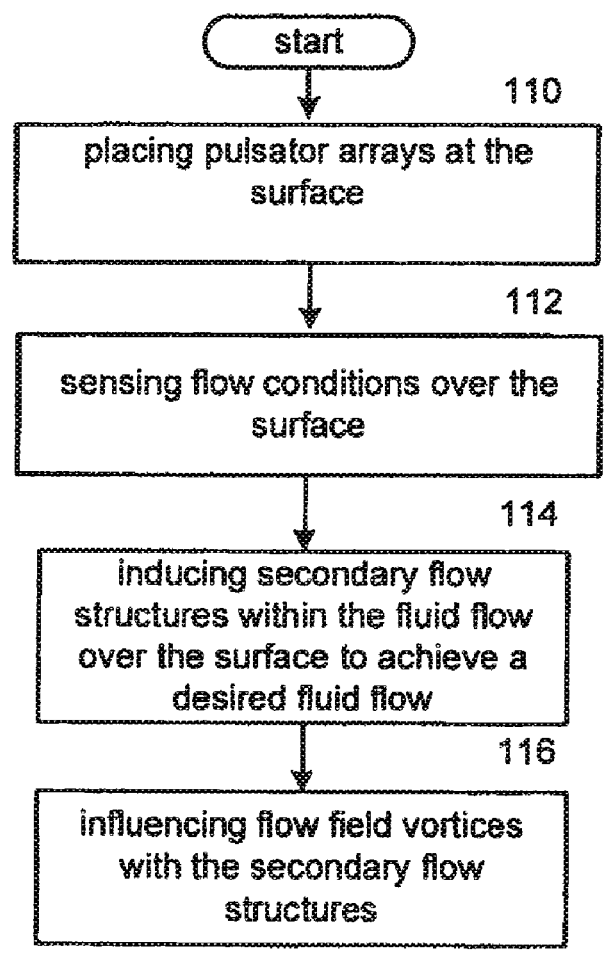
FIG. 9 provides a logic flow diagram depicting one methodology for influencing flow-fields in accordance with the present invention.

FIG. 9 provides a second logic flow diagram depicting a second flow control methodology associated with the present invention. In step 110, pulsator arrays are placed at the aerodynamic surface. Additionally, sensors at the aerodynamic surface sense flow conditions over the aerodynamic surface in step 112. The sensed flow conditions are used to direct pulsator arrays placed in step 110 to induce secondary flow structures in step 114 within the fluid flow in order to achieve the desired fluid flow. As in FIG. 8, the induced secondary flow structures influence the flow field vortices within the fluid flow in Step 116.

Figure 10:
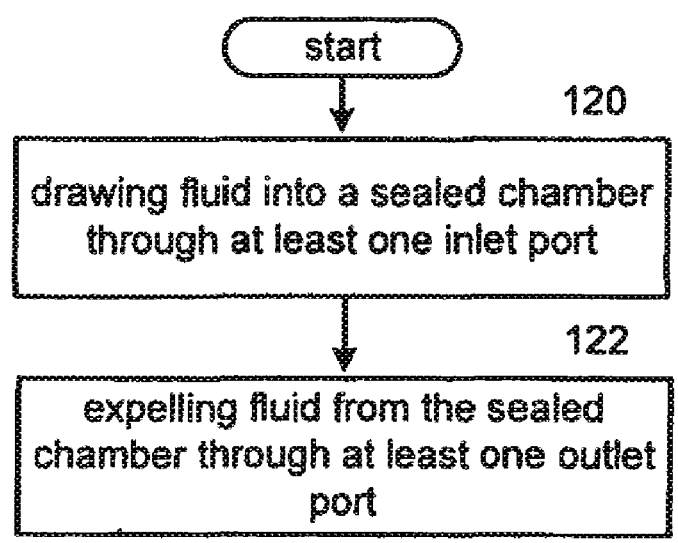
FIG. 10 provides a logic flow diagram depicting one methodology for producing synthetic jets in accordance with the present invention.

FIG. 10 provides a logic flow diagram in accordance with an embodiment of the present invention. This embodiment produces a pulse jet that essentially involves two steps, Step 120 and 122. In Step 120 fluid may be drawn into a sealed chamber through at least one inlet port. Outward deflection of the diaphragms on the wall of the chamber causes fluid to be drawn into the sealed chamber. Then in Step 122 fluid may be expelled from the sealed chamber through an outlet port. Inward deflection of the diaphragms force fluid from the sealed chamber through the outlet port. A high performance mechanical actuator such as a high performance dual solenoid may be used to deflect the diaphragms on the walls of the sealed chamber. Additionally, to further improve performance of the sealed chamber, an elastic or super elastic alloy may be used to form the walls of the sealed chamber. A control signal used to apply to the HPDS solenoid may be used to modulate the outlet flow or jet from the sealed chamber. The inlet and outlet port may be combined into a single port, as illustrated by port 25 (FIG. 2), to produce a zero net mass flow device or two one-way ports may be used to provide a positive displacement device.

In other embodiments the synthetic pulsator of the present invention is being incorporated into an aerodynamic surface in order to manipulate the primary flow over the aerodynamic surface or within a flow control system that may manipulate primary flow over a surface. Additionally, this embodiment in the present invention may also utilize the synthetic pulsator within an aerodynamic or hydrodynamic control surface in order to manipulate primary flow over the surface wherein this may be done on a vehicle or a structure in an aerodynamic or hydrodynamic environment.

Embodiments of the present invention may enable new and improved designs of tactical aircraft by allowing unconventional aerodynamic shapes. This is in part achieved by the weight reduction associated with synthetic pulsator flow control systems when compared to conventional systems. Additionally, flow control can reduce cyclic fatigue of components located within fluid flow. Stress peak amplitudes experienced by a component within the fluid flow for a normal flow can be greatly reduced by reducing or eliminating interactions between flow field vortices and structural components.

The present invention may be used to improve flow behavior in hydrodynamic applications as well. This may minimize head loss in a piping system, reduce flow noise within a piping system or over a submerged structure or to control and manipulate hydrodynamic flow about a watercraft for direction and thrust control.

Further embodiments of the present invention may include air-handling units such as HVAC systems, chemical processors, automobile air intake manifold or biomedical applications. However, the present invention should not be limited to these applications.

In summary, the present invention provides a system and method for actively manipulating fluid flow over a surface using synthetic pulsators. Synthetic pulsators produce pulsed jet operable to manipulate the primary fluid flow proximate to the synthetic pulsator. The synthetic pulsator includes a synthetic jet actuator(s) located within an ambient pressure chamber, wherein the synthetic jet actuator is operable to produce an oscillatory flow. The oscillatory flow of the synthetic jet(s) produces the pulsed jet operable to manipulate the primary fluid flow. These synthetic pulsators may then be actively manipulated to control the flow behavior of the ducted fluid flow, influence the inception point and trajectory of flow field vortices within the fluid flow, and reduce flow separation within the primary fluid flow.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. An apparatus for manipulating a primary fluid flow over a surface, the apparatus comprising:
   a surface adapted to receive a primary fluid flow;
   a first diaphragm and a second diaphragm;
   a sealed chamber embedded in the surface, the sealed chamber having at least one orifice, wherein the first diaphragm and the second diaphragm form outer walls of the sealed chamber;
   a first mechanical actuator coupled to the first diaphragm operable to deflect the first diaphragm; and a second mechanical actuator coupled to the second diaphragm operable to deflect the second diaphragm; and wherein:

outward deflection of the first diaphragm and the second diaphragm cause the chamber to fill with fluid; and inward deflection of the first diaphragm and the second diaphragm cause the chamber to create a pulsed jet by expelling fluid through the orifice of the chamber to manipulate the primary fluid flow that is flowing over the surface.

2. The apparatus of claim 1, wherein the first mechanical actuator and the second mechanical actuator each comprise a high performance dual solenoid valve.

3. The apparatus of claim 1, wherein the first diaphragm and the second diaphragm each comprise a super-elastic alloy.

4. The apparatus of claim 1, wherein the at least one orifice comprises:
a first one way inlet port; and
a second one way outlet port.

5. The apparatus of claim 1, wherein the at least one orifice comprises a dual direction inlet and outlet port.

6. The apparatus of claim 1, wherein deflection of the first diaphragm and the second diaphragm is modulated by a control signal to the first mechanical actuator and the second high performance mechanical actuator.

7. The synthetic pulsator of claim 1, wherein the pulsed jet is operable to produce an oscillatory flow.

8. The apparatus of claim 1, further comprising a port adapted to introduce a steady fluid flow into the chamber, wherein the oscillatory flow is adapted to mix with the steady fluid flow to produce a pulsed jet operable to manipulate the primary fluid flow.

9. The apparatus of claim 1, wherein the pulsed jet is operable to impart high amplitude high frequency eddies to the primary fluid flow.

10. The apparatus of claim 1, wherein the first and second mechanical actuators are operable to provide a KHz pulsed jet.

11. A method of manipulating a primary fluid flow over a surface, the method comprising:

flowing the primary fluid over the surface;

drawing fluid into a sealed chamber through at least one inlet port, wherein outward deflection of a first diaphragm and a second diaphragm draws fluid into the sealed chamber;

creating a pulsed jet by expelling fluid from the sealed chamber through at least one outlet port, wherein inward deflection of the first diaphragm and the second diaphragm forces fluid from the sealed chamber through the at least one outlet port, wherein the fluid from the sealed chamber contacts the primary fluid flow; and wherein a mechanical actuator couples to the first diaphragm and the second diaphragm to deflect the first diaphragm and second diaphragm.

12. The method of claim 11, wherein the mechanical actuator comprises a dual solenoid valve.

13. The method of claim 11, wherein the first diaphragm and the second diaphragm comprise a super-elastic alloy.

14. The method of claim 11, wherein the at least one inlet port and the at least one outlet port comprise a single dual direction inlet and outlet port.

15. The method of claim 11, wherein deflection of the first diaphragm and the second diaphragm is modulated by a control signal to the mechanical actuator.

16. The method of claim 11, wherein the pulsed jet is operable to produce an oscillatory flow.

17. The method of claim 16, further comprising flowing a steady fluid flow into the chamber, wherein the oscillatory flow mixes with the steady fluid flow to produce a pulsed jet operable to manipulate the primary fluid flow about the pulsed jet.

18. The method of claim 11, wherein the pulsed jet is operable to impart high amplitude high frequency eddies to the primary fluid flow.

19. The method of claim 11, wherein the pulsed jet is a KHz pulsed jet.

20. An aerodynamic surface operable to manipulate a primary flow over the aerodynamic surface, wherein the aerodynamic surface comprises:

at least one array of synthetic pulsators located substantially upstream of fluid flow over the aerodynamic surface operable to introduce secondary flows in the near wall boundary layer;

a control system operably coupled to the at least one array of synthetic pulsators, wherein the control system is operable to direct the at least one array of synthetic pulsators to introduce secondary flows in order to achieve a desired fluid flow over the aerodynamic surface; and wherein the synthetic pulsators each comprise:

a first diaphragm and a second diaphragm;

a sealed chamber having at least one port, wherein the first diaphragm and the second diaphragm form outer walls of the sealed chamber;

a first high performance mechanical actuator coupled to the first diaphragm operable to deflect the first diaphragm; and a second high performance mechanical actuator coupled to the second diaphragm operable to deflect the second diaphragm; and wherein:

outward deflection of the first diaphragm and the second diaphragm cause the chamber to fill with fluid; and inward deflection of the first diaphragm and the second diaphragm cause the chamber to expel fluid.

21. An aerodynamic surface operable to manipulate a primary flow over the aerodynamic surface, wherein the aerodynamic surface comprises:

at least one array of synthetic pulsators located substantially upstream of fluid flow over the aerodynamic surface operable to introduce secondary flows in the near wall boundary layer, wherein the synthetic pulsator comprise:

a first diaphragm and a second diaphragm;

a sealed chamber having at least one port, wherein the first diaphragm and the second diaphragm form outer walls of the sealed chamber;

a first high performance mechanical actuator coupled to the first diaphragm operable to deflect the first diaphragm; and a second high performance mechanical actuator coupled to the second diaphragm operable to deflect the second diaphragm; and wherein:

outward deflection of the first diaphragm and the second diaphragm cause the chamber to fill with fluid; and inward deflection of the first diaphragm and the second diaphragm cause the chamber to expel fluid; and a control system operably coupled to the at least one array of synthetic pulsators, wherein the control system is operable to direct the at least one array of synthetic pulsators to introduce secondary flows in order to achieve a desired fluid flow over the aerodynamic surface.

22. The aerodynamic surface of claim 21, further comprising:
a sensing system operably coupled to the control system, wherein the sensing system is operable to detect fluid flow characteristics over the aerodynamic surface.

23. The aerodynamic surface of claim 22, wherein the control system:
compares the detected fluid flow characteristics over the aerodynamic surface to the desired fluid flow over the aerodynamic surface; and
directs the at least one array of synthetic pulsators to introduce secondary flows in order to achieve the desired fluid flow over the aerodynamic surface based on the comparison.

24. The aerodynamic surface of claim 22, wherein the at least one array of synthetic pulsators is located along a leading edge of the aerodynamic surface.

25. The aerodynamic surface of claim 22, wherein the desired fluid flow directs flow field vortices away from downstream components.

26. The aerodynamic surface of claim 22, wherein the desired fluid flow reduces downstream fatigue and/or buffeting.

27. A flow control system operable to manipulate a primary flow over an aerodynamic surface, wherein the flow control system comprises:
at least one array of synthetic pulsators located substantially upstream of fluid flow over the aerodynamic surface operable to introduce secondary flows in the near wall boundary layer, wherein the synthetic pulsator comprise:
a first diaphragm and a second diaphragm;
a sealed chamber having at least one port, wherein the first diaphragm and the second diaphragm form outer walls of the sealed chamber;
a first high performance mechanical actuator coupled to the first diaphragm operable to deflect the first diaphragm; and
a second high performance mechanical actuator coupled to the second diaphragm operable to deflect the second diaphragm; and wherein:
outward deflection of the first diaphragm and the second diaphragm cause the chamber to fill with fluid; and
inward deflection of the first diaphragm and the second diaphragm cause the chamber to expel fluid; and
a controller operably coupled to the at least one array of synthetic pulsators, wherein the control system is operable to direct the at least one array of synthetic pulsators to introduce secondary flows in order to achieve a desired fluid flow over the aerodynamic surface.

28. An aerodynamic control surface operable to manipulate a primary flow over the aerodynamic control surface, wherein the aerodynamic surface comprises:
at least one array of synthetic pulsators located substantially upstream of fluid flow over the aerodynamic control surface operable to introduce secondary flows in the near wall boundary layer, wherein the synthetic pulsator comprise:
a first diaphragm and a second diaphragm;
a sealed chamber having at least one port, wherein the first diaphragm and the second diaphragm form outer walls of the sealed chamber;
a first high performance mechanical actuator coupled to the first diaphragm operable to deflect the first diaphragm; and
a second high performance mechanical actuator coupled to the second diaphragm operable to deflect the second diaphragm; and wherein:
outward deflection of the first diaphragm and the second diaphragm cause the chamber to fill with fluid; and
inward deflection of the first diaphragm and the second diaphragm cause the chamber to expel fluid; and
a control system operably coupled to the at least one array of synthetic pulsators, wherein the control system is operable to direct the at least one array of synthetic pulsators to introduce secondary flows in order to achieve a desired fluid flow over the aerodynamic control surface.

* * * * *